United States Patent [19]

Mine et al.

[11] 4,157,357

[45] Jun. 5, 1979

[54] CURABLE TWO-PART SILICONE RUBBER COMPOSITIONS WITH IMPROVED ADHESION PROPERTIES

[75] Inventors: Katsutoshi Mine; Masuo Yokoyama, both of Ichihara, Japan

[73] Assignee: Toray Silicone Company, Ltd., Tokyo, Japan

[21] Appl. No.: 777,221

[22] Filed: Mar. 14, 1977

[30] Foreign Application Priority Data

Jun. 2, 1976 [JP] Japan .................................. 51/63553

[51] Int. Cl.² ....................... C08L 83/04; C08L 83/14
[52] U.S. Cl. ................................ 260/825; 260/824 EP
[58] Field of Search ........................ 260/825, 824 EP

[56] References Cited

U.S. PATENT DOCUMENTS

| | | | |
|---|---|---|---|
| 2,915,497 | 12/1959 | Clark | 260/46.5 H |
| 3,631,220 | 12/1971 | Wodjac | 260/825 |
| 3,691,206 | 9/1972 | Northrup | 260/824 EP |
| 3,996,195 | 12/1976 | Sato et al. | 260/825 |
| 4,082,719 | 4/1978 | Liles et al. | 260/825 |

FOREIGN PATENT DOCUMENTS

| | | | |
|---|---|---|---|
| 47-36255 | 1972 | Japan. | |
| 50-39345 | 1975 | Japan. | |
| 938701 | 10/1963 | United Kingdom | 260/825 |

*Primary Examiner*—Allan Lieberman
*Attorney, Agent, or Firm*—Robert L. McKellar

[57] ABSTRACT

Two-part curable silicone rubber compositions are described, in which the crosslinker for the curable silicone rubber composition also serves as the adhesion promoter. Such crosslinkers contain at least one epoxy group.

7 Claims, No Drawings

CURABLE TWO-PART SILICONE RUBBER COMPOSITIONS WITH IMPROVED ADHESION PROPERTIES

PRIOR ART

This invention is directed to a curable organopolysiloxane composition which possesses improved adhesiveness to various substrates.

More specifically, this invention is directed to organopolysiloxane compounds which are cured through the addition of silicon bonded hydrogen to lower alkenyl groups on silicon under the influence of catalysts and which have improved adhesion to various substrates.

Generally, the prior art organopolysiloxane compositions which harden by an addition reaction as discussed above, exhibit the inability to adhere to most substrates.

Usually, such materials must be used wherein primers are used to enhance the adhesion.

It is usually the case that when such systems are used, one is faced with at least a two-step process and this causes disadvantages in terms of increased process time, labor and cost.

Also, there is a disadvantage, in that, irregularly shaped surfaces do not receive an entire primer coat because of the structure of the surface itself.

Further, problems arise in the durability of the primer coating and in some cases, where attempts were made to use primers for adhering the organopolysiloxane compositions, as soon as the primer itself detaches, so did the cured composition.

In Japanese patent publications Nos. 36255/72 and 39345/75, attempts were made at preparing curable organopolysiloxane compositions with good adhesiveness which did not require a prior primer treatment. This attempt lead to unsatisfactory adhesion and the number of variable substrates where the treatment was effective was limited.

The purpose of this invention is therefore, to provide organopolysiloxane compositions which will adhere to variable substrates.

It is another object of this invention to provide a curable silicone composition which will adhere to variable substrates and which will cure through the addition of silicon bound hydrogen atoms to silicon bound lower alkenyl groups.

It is a further object of this invention to provide curable silicone compositions which will adhere well to variable substrates without the use of extraneous primers.

THE INVENTION

The invention consists of a curable composition of matter which consists of a mixture of (a) an organopolysiloxane containing at least two hydrogen atoms bound to silicon atoms, (b) an organopolysiloxane containing at least one A(R'O)$_2$Si group and at least two lower alkenyl radicals bonded to silicon atoms in each molecule, wherein A is a monovalent hydrocarbon radical containing

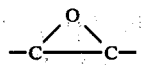

radical,

R' is a lower alkyl radical containing 1–6 carbon atoms, the sum of the number of hydrogen atoms bonded to silicon atoms in component (a) and the number of lower alkenyl groups bonded to silicon atoms in component (b) is 5 or greater, and (c) an addition reaction catalyst.

Organopolysiloxane (a) which contains at least two silicon bound hydrogen atoms has the general formula

wherein a has an average value of 1–3 and R is at least two hydrogen atoms, the remaining R radicals are substituted or unsubstituted monovalent hydrocarbon radicals or hydroxy radicals which do not contain any aliphatic unsaturation.

Organopolysiloxane (a) can be linear, branched linear, cyclic or resinous. It can be a copolymer or homopolymer.

The degree of polymerization can be from two to a high degree such as 500–2,000.

Materials with higher degrees of substitution can be present but the degree of difficulty in their preparation dictates that they would not be present in substantial proportions.

The unsubstituted hydrocarbon radicals can be for example the methyl, ethyl, n-propyl, octyl, cyclohexyl and phenyl groups, etc. The substituted hydrocarbon radicals can be for example tolyl, xylyl, benzyl, p-chlorophenyl, cyanoethyl groups, etc. Preferred R groups other than hydrogen are the methyl or phenyl groups.

The organosilicone compositions containing at least one A(R'O)$_2$Si group and at least 2 lower alkenyl groups bonded to silicon atoms per molecule of component (b) function as the crosslinking agents and at the same time, they are the components which provide the strong adhesiveness which is characteristic of this invention.

The epoxy containing monovalent hydrocarbon radical represented by A has the general formula

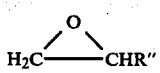

wherein R'' denotes divalent organic radicals such as methylene, ethylene, propylene, or phenylene, an ether linkage, a chloroethylene group, a fluoroethylene group,

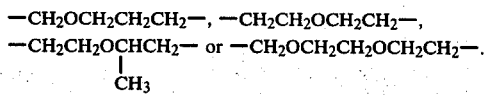

Other examples of A include the β-(3,4-epoxycyclohexyl)ethyl group and the γ-(3,4-epoxycyclohexyl)propyl groups, etc.

Among the organic compounds constituting component (b), are those containing a γ-epoxyethyl group, α-chloro-β-epoxyethyl group, γ-glycidylpropyl group, γ-(3,4-epoxycyclohexyl)ethyl group or the γ-(3,4-epoxycyclohexyl)propyl group. R' may be a methyl, ethyl, n-propyl, isopropyl or methoxyethyl group. The preferred R' is methyl, ethyl or a methoxyethyl group. For the lower alkenyl groups bonded to the silicon atoms, there are the vinyl group, allyl group, 1-propenyl group or isopropenyl group. The preferred lower alkenyl group is the vinyl group.
Examples of component (b) include copolymerized organosilicon compounds composed of
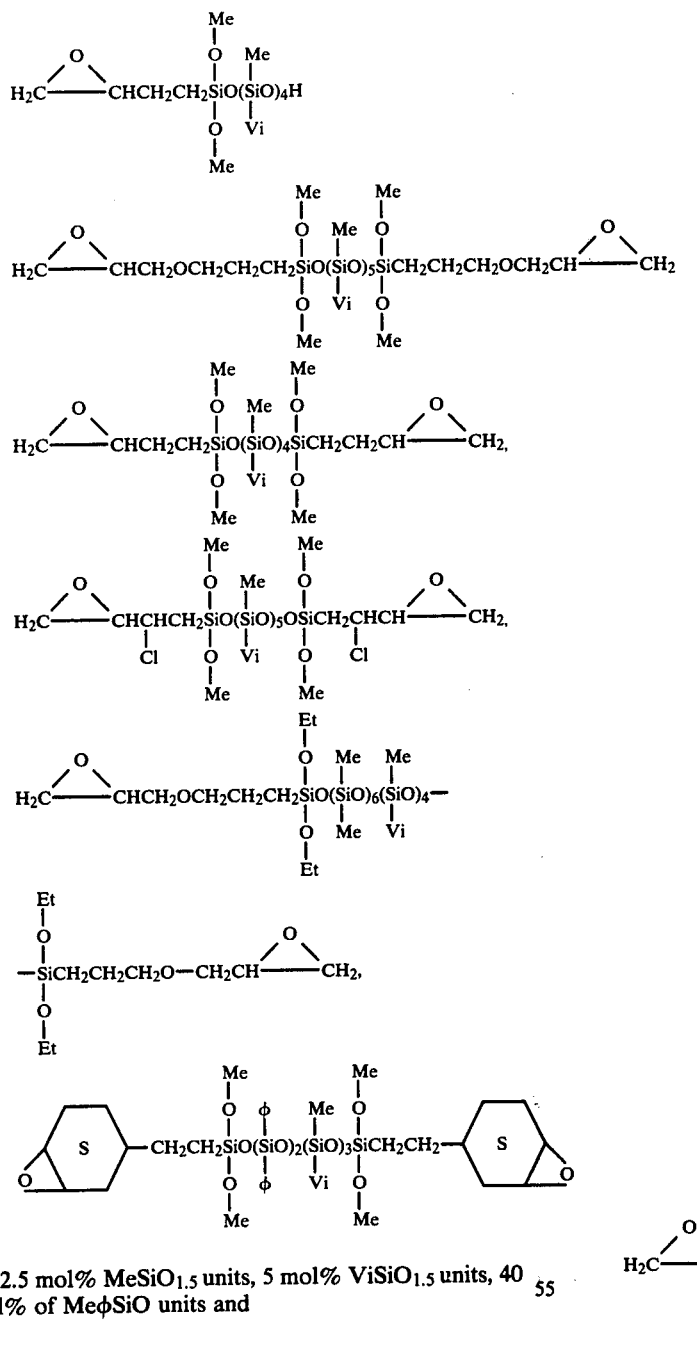
52.5 mol% MeSiO$_{1.5}$ units, 5 mol% ViSiO$_{1.5}$ units, 40 mol% of Me$\phi$SiO units and
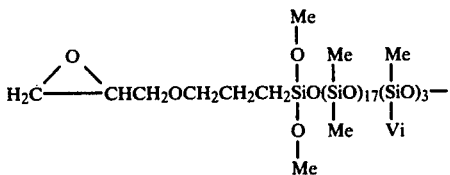
2.5 mol% of the above unit and include copolymerized resins composed of

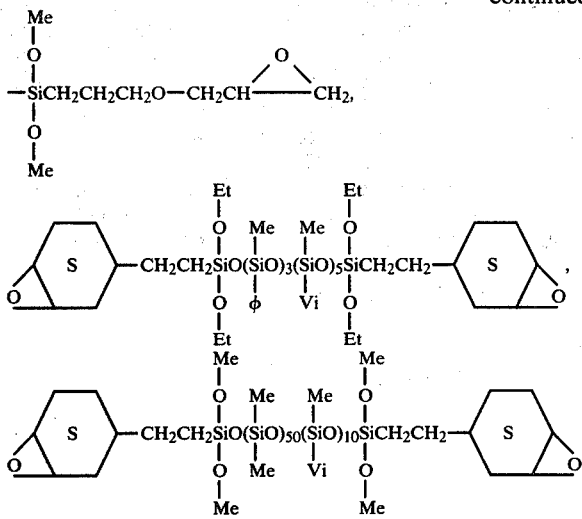

50 mol% MeSiO$_{1.5}$ units, 40 mol% of Me$\phi$SiO units, 4.7 mol% MeHSiO units, 2.3 mol% Me$_3$SiO$_{9.5}$ units and

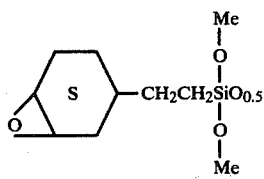

3.0 mol% of the above units, etc. Here, Me is a methyl group, Et is an ethyl group, Vi is a vinyl group and $\phi$ denotes a phenyl group.

Component (b) can be prepared by heating an organotrialkoxysilane in which the organic group is the epoxy containing monovalent hydrocarbon radical and an organopolysiloxane which contains a silanol group at 150°–160° C. for several hours to bring about dealcoholization condensation. It is desirable to compound components (a) and (b) in such a manner that 0.1–10 mols of lower alkenyl groups bonded to silicon atoms in component (b) are present per mol of hydrogen atoms bonded to silicon atoms in component (a). A range of 0.5–2.0 mols is particularly preferable.

The addition reaction catalysts of component (c) can be any catalyst which is effective for the addition reaction of the hydrogen atoms bonded to silicon atoms with the lower alkenyl groups bonded to silicon atoms. Examples include milled elemental platinum, milled platinum dispersed on a carbon powder, chloroplatinic acid, coordination compounds of chloroplatinic acid and olefins, coordination compounds of chloroplatinic acid and vinylsiloxane, tetrakis(triphenylphosphine)palladium, a mixture of palladium black and triphenylphosphine and rhodium catalysts.

As component (c), the platinum catalysts are preferred. The required amount of addition reaction catalysts of component (c) varies depending on the reaction and therefore can be selected as needed. For the platinum catalysts, it is preferred to use 0.1–40 parts by weight platinum per one million total parts by weight of components (a) and (b).

The compounds of this invention are composed of the above-mentioned three types of components and optional ingredients. These components are mixed in an appropriate manner according to one's requirements. When all of the three components have been mixed together, the addition reaction will begin immediately even at room temperature. The reaction mixture will eventually cure and therefore, in order to preserve the components in an uncured state for a long period of time. it is convenient to store them by appropriately dividing the three components into a mixture of components (a) and (c) with component (b) being separate.

When all three components of the compounds of this invention are mixed together and maintained at the necessary temperature for the necessary time, the reaction mixture hardens and becomes gelatinous, elastomeric or solid depending on the types of the components and the ratios used. The curing can occur even at room temperature, but to bring about a rapid curing, heating to 50°–150° C. or higher is preferred.

The compounds of this invention are characteristic in that they firmly adhere to the contacted materials during hardening regardless of their status, i.e., gelatinous, elastomeric or solid. In other words, the compounds of this invention strongly adhere to metal, glass, ceramics, stones, concrete, wood, paper, fibers, plastics and rubbers, etc. They exhibit a remarkable adhesiveness which is not observed in conventionally known organopolysiloxane compounds.

As the optional ingredients which may be used with the above-mentioned three components preferably there are used fillers such as powdered silica, precipitated silica, hydrophobic powdered silica, hydrophobic precipitated silica, pulverized quartz, diatomaceous earth, talc, aluminum silicate, zirconium silicate, alumina, calcium carbonate, zinc oxide, titanium dioxide, ferric oxide, glass fibers, asbestos, and glass beads, etc.; organic solvents such as xylene, toluene and trichloroethylene, etc.; addition reaction inhibitors such as benzotriazole, 2-ethynylisopropanol, and dimethylsulfoxide, etc.; flame retarding agents such as manganese carbonate and carbon black, etc.; heat resisting stabilizers; oil resisting stabilizers; pigments, etc. Organopolysiloxanes and organosilanes used for purposes other than improving adhesion can be compounded as additional components.

The compounds of this invention are useful as adhesive, sealing, coating, packing, injection and impregnating agents.

Practical examples are given below but they are only for the purpose of explanation and this invention is not limited to these examples. In the following examples, parts and % denote parts by weight and weight %. Unless specifically mentioned, all viscosities are indicated by values measured at 25° C. In the chemical formulae, Me is a methyl group, Et is an ethyl group, Vi is a vinyl group and φ is a phenyl group. "Ambient" in this invention means at or near room temperature and in the presence of normal atmospheric humidity.

EXAMPLE 1

100 parts of a copolymer composed of 90 mol% dimethylsiloxane units, 10 mol% hydrogen methylsiloxane units and having hydrogen dimethylsilyl groups as the endgroups and with a viscosity of 100 cs. and 50 parts of a compound with the formula (1),

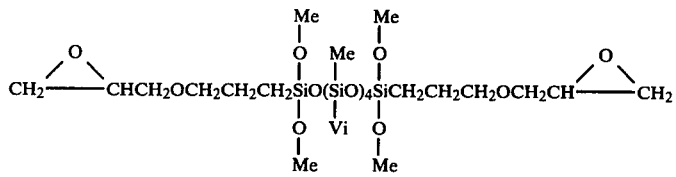

and an ethanol solution of chloroplatinic acid (10 ppm of platinum relative to the total amount of the above-mentioned polysiloxanes) were mixed thoroughly. This mixture was injected between an aluminum plate and a glass plate. These plates were placed in an oven and the mixture was hardened by heating at 150° C. for 30 minutes. After cooling to room temperature, the two plates were pulled apart. At this time, the silicon elastomer layer was broken, i.e., a so-called cohesive rupture occurred.

As a comparison sample, the compound represented by formula (2) was used in place of the compound represented by formula (1)

and a mixture was prepared. The adhesion test was conducted under the same conditions. The result was so-called interfacial peel off i.e. adhesive failure in which the silicon elastomer layer was peeled from the surface of the glass plate as well as from the surface of the aluminum plate.

EXAMPLE 2

40 parts of powdered silica (specific surface area, 200 m²/g) which had been surface treated with trimethylsilyl groups to make it hydrophobic were added to 100 parts of a copolymer composed of 95 mol% dimethylsiloxane units, 50 mol% hydrogen methylsiloxane units and with trimethylsilyl endgroups and with a viscosity of 1000 cs., were mixed well until a homogeneous mixture was obtained.

Then, 20 parts of a compound with formula (3)

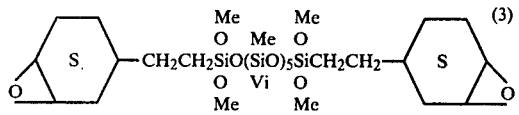

and a 2-ethylhexanol solution of chloroplatinic acid (5 ppm of platinum relative to the total amount of the above-mentioned polysiloxanes) were mixed well into the mixture. The resulting mixture was formed into a sheet by two rollers and this sheet was inserted between stainless steel and a polyester film. After pressing, it was then heated at 120° C. for 60 minutes for curing. After cooling to room temperature, an end of the polyester film was pulled at a 180° angle peel. The polyester film tore before the silicon elastomer layer was disrupted.

As a comparison sample, a mixture was prepared by adding the compound with formula (4)

instead of the addition of the compound with formula (3). The adhesion test was carried out under identical conditions. The result was a so-called interfacial peel-off in which the silicon elastomer layer was peeled from the polyester film surface and the stainless steel surface.

EXAMPLE 3

100 parts of dimethylpolysiloxane with hydrogen dimethylsilyl endgroups and a viscosity of 5,000 cs., 2 parts of $Si(OSiMe_2H)_4$, 4.0 parts of the compound with formula (5)

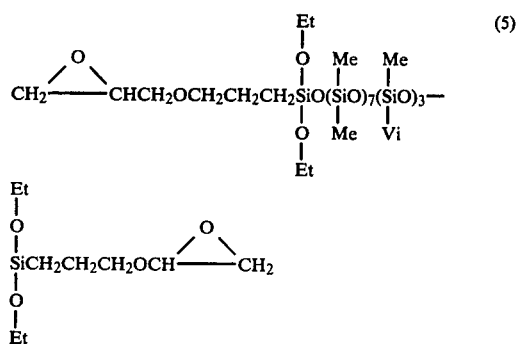

and 30 parts of powdered silica which had been surface treated with trimethylsilyl groups to give hydrophobicity (specific surface area, 200 m²/g) were mixed well. 20 ppm of platinum dispersed on carbon powder relative to the total amount of the above-mentioned copolymers were then added and the mixture was mixed thoroughly. This mixture was then placed between a polyimide film and a copper plate. This was placed in an oven and hardened by heating at 200° C. for 20 minutes. After cooling to room temperature, the polyimide film was pulled in a 180° peel direction. The polyimide film tore before the silicon elastomer layer was disrupted.

As a comparison sample, a mixture was prepared by adding the compound with formula (6)

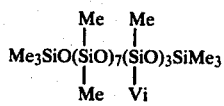

instead of adding the compound with formula (5). The adhesion test was conducted under identical conditions. The result was a so-called interfacial peel-off in which the silicon elastomer layer was peeled from the polyimide surface.

EXAMPLE 4

To 100 parts of a hydrogen substituted organopolysiloxane resin composed of 10 mol% $Me_3SiO_{0.5}$ units, 10 mol% $Me_2HSiO_{0.5}$ units, 40 mol% $\phi SiO_{1.5}$ units and 30 mol% $MeSiO_{1.5}$ units and with a viscosity of 250 cs., the compound with formula (7),

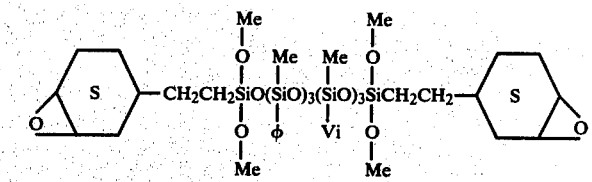

and a coordinate compound of chloroplatinic acid and divinyltetramethyldisiloxane (10 ppm platinum relative to the above-mentioned organopolysiloxane mixture) were added and mixed well. This mixture was immediately poured into a box made of nonyl resin (General Electric Co., denatured polyphenylene oxide system resin) and after curing by heating at 100° C. for one hour, the box was inverted and struck from above. The hardened silicon resin was firmly bonded and did not lose adhesion to the box.

As a comparison sample, a mixture was prepared by adding the compound with formula (8)

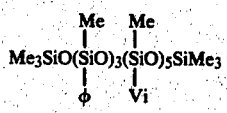

instead of adding the compound with formula (7). The adhesion test was conducted under identical conditions. The hardened silicon resin easily peeled from the nonyl resin box.

That which is claimed is:

1. A curable composition of matter which consists essentially of a mixture of
    (a) an organopolysiloxane containing at least two hydrogen atoms bonded to silicon atoms and having the general formula $R_aSiO_{4-a/2}$ wherein a has an average value of 1-3 and R is hydrogen, hydroxy radicals or unsubstituted or substituted monovalent hydrocarbon radicals which do not contain aliphatic unsaturation,
    (b) an organopolysiloxane containing at least one $A(R'O)_2Si-$ group and at least two lower alkenyl radicals bonded to silicon atoms, in each molecule, wherein
    A is a monovalent hydrocarbon radical containing a

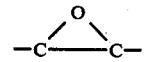

radical,
    R' is a lower alkyl radical containing 1-6 carbon atoms,
    the sum of the number of hydrogen atoms bonded to silicon atoms in component (a) and the number of lower alkenyl radicals bonded to silicon atoms in component (b) is five or greater wherein there is present 0.1-10 mols of lower alkenyl groups bonded to silicon in (b) for every mol of hydrogen atoms bonded to silicon atoms in (a), and
    (c) 0.1-40 parts by weight per one million parts by weight of components (a) and (b) of an addition reaction catalyst for the addition reaction of the hydrogen atoms bonded to silicon atoms with the lower alkenyl groups bonded to silicon atoms.

2. A composition of matter as in claim 1 wherein component (c) is a platinum catalyst.

3. A composition of matter as in claim 1 wherein component (a) contains methyl and phenyl groups bonded to silicon atoms in addition to the hydrogen atoms present.

4. A composition of matter as in claim 1 wherein component (b) contains vinyl radicals as the lower alkenyl radicals.

5. A composition of matter as in claim 1 wherein component (b) contains methyl, ethyl or methoxyethyl as the lower alkyl radicals, R'.

6. A composition of matter as in claim 1 wherein in the formula $A(R'O)_2Si-A$ is selected from the group consisting of
    (i) β-epoxyethyl,
    (ii) α-chloro-β-epoxyethyl,
    (iii) γ-glycidylpropyl,
    (iv) β-(3,4-epoxycyclohexyl)ethyl and
    (v) γ-(3,4-epoxycyclohexyl)propyl.

7. A product comprising the cured composition of claim 1.

* * * * *

UNITED STATES PATENT AND TRADEMARK OFFICE
CERTIFICATE OF CORRECTION

Page 1 of 2

PATENT NO. : 4,157,357
DATED : June 5, 1979
INVENTOR(S) : Katsutoshi Mine; Masuo Yokoyama It is certified that error appears in the above-identified patent and that said Letters Patent are hereby corrected as shown below:

In Column 1, line 63; the line reading "A is a monovalent hydrocarbon radical containing" should read "A is a monovalent hydrocarbon radical containing a".

In Column 2, line 60; the word reading "γ-epoxyethyl" should read "β-epoxyethyl".

In Column 7, line 46; the line reading "conducted under the same conditions. The result was" should read "conducted under the same conditions. The result was a".

UNITED STATES PATENT AND TRADEMARK OFFICE
CERTIFICATE OF CORRECTION

PATENT NO. : 4,157,357
DATED : June 5, 1979
INVENTOR(S) : Katsutoshi Mine; Masuo Yokoyama It is certified that error appears in the above-identified patent and that said Letters Patent are hereby corrected as shown below:

In Column 7, lines 63-67; the formula reading

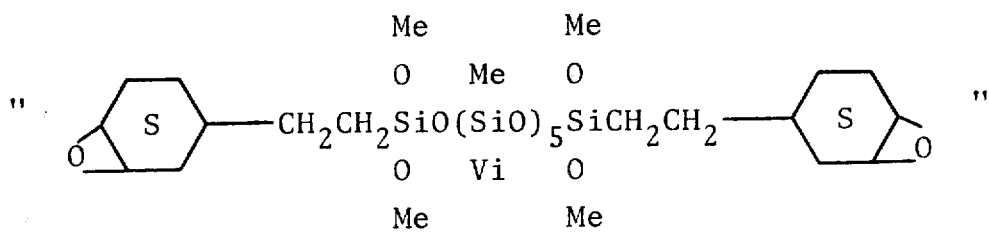

should read

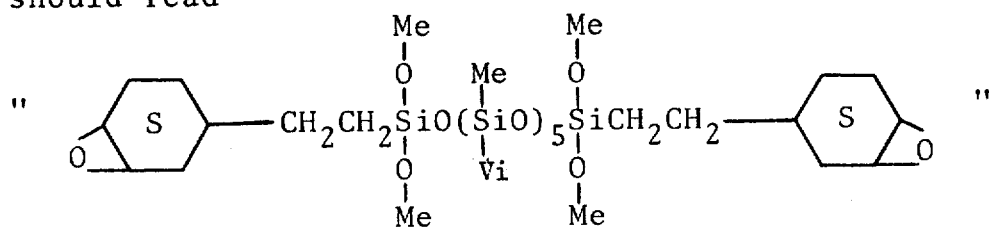

Signed and Sealed this

Twentieth Day of October 1981

[SEAL]

Attest:

GERALD J. MOSSINGHOFF

Attesting Officer    Commissioner of Patents and Trademarks